(12) United States Patent
Park et al.

(10) Patent No.: US 10,635,421 B2
(45) Date of Patent: Apr. 28, 2020

(54) ELECTRONIC DEVICE, COMPILING METHOD AND COMPUTER-READABLE RECORDING MEDIUM

(71) Applicant: Samsung Electronics Co., Ltd., Suwon-si, Gyeonggi-do (KR)

(72) Inventors: Jae-man Park, Suwon-si (KR); Jun-young Cho, Gunpo-si (KR); Young-il Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/742,740

(22) PCT Filed: May 12, 2016

(86) PCT No.: PCT/KR2016/005025
§ 371 (c)(1),
(2) Date: Jan. 8, 2018

(87) PCT Pub. No.: WO2017/018644
PCT Pub. Date: Feb. 2, 2017

(65) Prior Publication Data
US 2018/0203678 A1     Jul. 19, 2018

(30) Foreign Application Priority Data

Jul. 30, 2015   (KR) .................. 10-2015-0108276

(51) Int. Cl.
*G06F 8/53* (2018.01)
*G06F 9/455* (2018.01)
(Continued)

(52) U.S. Cl.
CPC .................. *G06F 8/53* (2013.01); *G06F 8/30* (2013.01); *G06F 8/41* (2013.01); *G06F 8/42* (2013.01);
(Continued)

(58) Field of Classification Search
None
See application file for complete search history.

(56) References Cited

U.S. PATENT DOCUMENTS 6,233,725 B1   5/2001   Beadle et al.
6,851,109 B1   2/2005   Alexander, III et al.
(Continued)

FOREIGN PATENT DOCUMENTS

JP            05-265768 A    10/1993
KR    10-2010-0106409 A     10/2010
(Continued)

OTHER PUBLICATIONS

Y. Lim, S. Parambil, C. Kim and S. Lee, "A Selective Ahead-Of-Time Compiler on Android Device," 2012 International Conference on Information Science and Applications, Suwon, 2012, pp. 1-6. (Year: 2012).*

*Primary Examiner* — Anna C Deng
*Assistant Examiner* — Binh Luu
(74) *Attorney, Agent, or Firm* — Jefferson IP Law, LLP

(57) ABSTRACT

The present invention relates to an electronic device, a compiling method, and a computer-readable recording medium. An electronic device according to an embodiment of the present invention compiles a source code of a dynamic programming language compiled during execution of a program to the level of a static programming language compiled before execution, and may comprise a processor which determines whether the source code of the dynamic programming language generated when a command for operating the program is received can be processed by the first compiler in the same manner as the source code of the static programming language processing, and converts the
(Continued)

source code of the dynamic programming language by the first compiler if the code can be processed as a result of the determination.

9 Claims, 12 Drawing Sheets

(51) Int. Cl.
*G06F 8/41* (2018.01)
*G06F 8/30* (2018.01)

(52) U.S. Cl.
CPC .............. *G06F 8/43* (2013.01); *G06F 8/49* (2013.01); *G06F 9/4552* (2013.01); *G06F 9/45529* (2013.01)

(56) References Cited

U.S. PATENT DOCUMENTS

| | | | |
|---|---|---|---|
| 7,685,581 B2 | 3/2010 | Plesko et al. | |
| 8,819,649 B2 | 8/2014 | Lafreniere et al. | |
| 8,869,120 B2 | 10/2014 | Huuck et al. | |
| 8,959,495 B2 | 2/2015 | Chafi et al. | |
| 9,430,200 B1* | 8/2016 | Trofin | G06F 8/443 |
| 2003/0005425 A1* | 1/2003 | Zee | G06F 8/41 717/166 |
| 2005/0149910 A1* | 7/2005 | Prisament | G06F 8/427 717/115 |
| 2006/0158354 A1* | 7/2006 | Aberg | G06F 8/447 341/50 |
| 2006/0271920 A1* | 11/2006 | Abouelsaadat | G06F 9/454 717/137 |
| 2008/0028377 A1* | 1/2008 | Dembo | G06F 9/4484 717/144 |
| 2009/0106743 A1* | 4/2009 | Parisien | G06F 8/51 717/136 |
| 2010/0083240 A1* | 4/2010 | Siman | G06F 8/433 717/144 |
| 2012/0272224 A1* | 10/2012 | Brackman | G06F 8/54 717/151 |
| 2013/0185626 A1 | 7/2013 | Jang et al. | |
| 2014/0082597 A1* | 3/2014 | Chafi | G06F 8/443 717/148 |
| 2014/0123118 A1 | 5/2014 | Goetz et al. | |
| 2014/0165035 A1* | 6/2014 | Campbell | G06F 8/72 717/121 |
| 2015/0128115 A1 | 5/2015 | Chafi et al. | |
| 2015/0154011 A1* | 6/2015 | Ceng | G06F 8/51 717/137 |
| 2015/0207680 A1* | 7/2015 | Ivanov | H04B 1/40 455/73 |
| 2015/0277881 A1* | 10/2015 | Strehovsky | G06F 8/49 717/154 |
| 2016/0041816 A1* | 2/2016 | Yang | G06F 8/52 717/148 |
| 2017/0083431 A1* | 3/2017 | Burger | G06F 9/268 |
| 2017/0270245 A1* | 9/2017 | van Rooyen | G06F 19/28 |
| 2018/0032420 A1* | 2/2018 | Wadsworth | G06F 11/362 |
| 2019/0243625 A1* | 8/2019 | Sabne | G06F 8/427 |

FOREIGN PATENT DOCUMENTS

| | | |
|---|---|---|
| KR | 10-2011-0081720 A | 7/2011 |
| KR | 10-2013-0083764 A | 7/2013 |

* cited by examiner

150'/210-2'

(a)   var v = 1+3
      print (v)
      v = "string" + 10
      print (v)

OMITTED
...

(c)   v = add int 1, 3
      call print (v)
      v = add string "str", 10

(d)   JITC (a)  eval('var a = 1')

OMITTED
...

(d)  JITC

ELECTRONIC DEVICE, COMPILING METHOD AND COMPUTER-READABLE RECORDING MEDIUM

CROSS-REFERENCE TO RELATED APPLICATIONS

This application claims priority from Korean Patent Application No. 10-2015-0108276, filed on Jul. 30, 2015, in the Korean Intellectual Property Office, the disclosure of which is incorporated herein by reference in its entirety.

BACKGROUND

1. Field of the Invention

Devices and methods consistent with what is disclosed herein relate to an electronic device, a compiling method and a computer readable recording medium, and more particularly, to an electronic device for optimizing compilation of a source code of a dynamic programming language such as JavaScript to a level of static programming language such as C language, a compiling method and a computer readable recording medium.

2. Description of the Related Art

Two commonly used methods for compiling programming languages are Ahead-of Time Compilation (AOTC) and Just-in-Time Compilation (JITC) techniques.

In the JITC which is mainly used for compiling a dynamic programming language such as JavaScript, compilation to a machine code (or a machine language) may be proceeded during program execution. A source code may be divided into specific units (mainly, function units) and a portion of the code may be compiled and executed at the time when first paged. The compiled machine code may be cached and reused when the same portion is paged again later on. Therefore, a programmer may provide a high-level source code and a program user may execute compiling by a JITC method each time a program is executed.

The JITC method may have significant two advantages. First, in the JITC, the compilation may be proceeded during runtime, i.e. during program execution, and thus program analyzing information which is obtained only when the program is executed may be used. For example, when executing a JavaScript program, the exact type of function 'argument' may be obtained when only when the function is paged. With such the advantage, the JITC may be suitable for the dynamic programming language such as JavaScript. Second, a code area of a memory area may be reduced since only the code paged during runtime is compiled. In other words, the JTIC may not load the part which is not actually executed in the source code to a memory. However, additional memory and power consumption may increase due to program analysis and compilation during programming execution.

On the contrary, in the AOTC method used for compiling a static programming language such as C language, the entire source code of a program may be compiled in advance of program execution and provided to a program user in a machine code form. The greatest benefit from the AOTC may be the higher capacity than the JITC in running time since a source code is not compiled during runtime.

However, it may be difficult to apply such the AOTC method to the dynamic programming language since the information analyzed during the runtime may not be used as in the JITC. In other words, conventionally, in the case of the dynamic programming language, there has been no choice but using the JITC due to the nature of language which makes it difficult to use the AOTC such as not being able to support all the syntaxes.

However, using the JITC with respect to the dynamic programming language such as JavaScript in the constrained embedded environment or mobile environment has many disadvantages in terms of time, memory and power consumption.

SUMMARY

An aspect of the exemplary embodiments relates to an electronic device for optimizing compilation of a source code of a dynamic programming language such as JavaScript to a level of static programming language such as C language, a compiling method and a computer readable recording medium.

According to an exemplary embodiment, there is provided a method for compiling a source code of a dynamic programming language compiled during program execution to a level of a static programming language compiled before program execution, the method may include determining whether an input source code of the dynamic programming language is processed by a first compiler in the same manner as a processing of a source code of the static programming language, and converting the input source code of the dynamic programming language by the first compiler and outputting the converted source code when processing is available as a result of the determining.

The source code of the dynamic programming language, when containing a function (func) relating to a command and a variable depending on the function, may include a form in which a type of variable remains the same with respect to a source code of an identical function.

The method may further include converting the source code of the dynamic programming language by the first compiler and outputting the converted source code, and converting the source code of the dynamic programming language by a second compiler and outputting the converted source code when the processing is not available as a result of the determining.

The first compiler may include a compiler in which Ahead-of Time Compilation (AOTC) is available, and the second compiler may include a compiler in which Just-in-Time Compilation (JITC) is available.

The method may further include tokenizing and decomposing the input source code of the dynamic programming language and forming a decomposed partial code into a tree form, wherein the determining whether the input source code is converted by the first compiler comprises analyzing the decomposed partial code formed in the tree form and determining whether conversion by the first compiler is available.

The determining whether the source code is converted by the first compiler may include determining whether there is a variable whose type does not remain the same with respect to an identical function relating to a command in the source code of the dynamic programming language, determining whether the source code of the dynamic programming language includes a syntax in conformity with the first compiler when the variable is not present, and determining that the converting is available when the syntax of the source code of the dynamic programming language is in conformity with the first compiler.

According to an exemplary embodiment, there is provided an electronic device for compiling a source code of a dynamic programming language compiled during program execution to a level of a static programming language compiled before program execution including a processor configured to determine whether the source code of the dynamic programming language which is generated when a command for operating a program is received is processed by a first compiler in the same manner as a processing of a source code of the static programming language, and convert the source code of the dynamic programming language by the first compiler when processing is available as a result of determination.

The source code of the dynamic programming language, when containing a function (func) relating to a command and a variable depending on the function, may include a form in which a type of variable remains the same with respect to a source code of an identical function.

The processor may convert and output the source code of the dynamic programming language by the first compiler, and as the result of determination, the processing is not available, convert and output the source code by a second compiler.

The first compiler may include a compiler in which Ahead-of Time Compilation (AOTC) is available, and the second compiler may include a compiler in which Just-in-Time Compilation (JITC) is available.

The processor may tokenize and decompose the generated source code of the dynamic programming language, form a decomposed partial code into a tree form, analyze the decomposed partial code formed in the tree form, and determine whether conversion by the first compiler is available.

The processor, in the source code of the dynamic programming language, may determine whether there is a variable whose type does not remain the same with respect to an identical function relating to a command, when the variable is not present, determine whether the source code of the dynamic programming language includes a syntax in conformity with the first compiler, and when the syntax of the source code of the dynamic programming language is in conformity with the first compiler, determine that converting is available.

The processor, when a syntax of a predetermined language does not exist in the source code of the dynamic programming language, may determine that syntax of the source code of the dynamic programming language is in conformity with the first compiler.

The syntax of the predetermined language may include a specific function designated by a user or a system designer.

The designated specific function may include a function 'eval(uate)'.

According to an exemplary embodiment, there is provided a computer readable recording medium including a program for performing a method for compiling a source code of a dynamic programming language compiled during program execution to a level of a static programming language compiled before program execution, the compiling method may include determining whether an input source code of the dynamic programming language satisfies predetermined conditions, and when the predetermined conditions are satisfied, converting the input source code of the dynamic programming language by the same compiling method as a processing of a source code of the static programming language and outputting the converted source code.

According to the above-described various exemplary embodiments, a compiling capacity of an electronic device may be improved by limitedly or selectively processing a source code of a dynamic programming language by AOTC compared to the conventional case of processing the source code of the dynamic programming language by JITC.

DETAILED DESCRIPTION OF EXEMPLARY EMBODIMENTS

Before describing, an electronic device 90 according to an exemplary embodiment may include a mobile device such as a smart phone, an MP3, a PMP, a laptop computer, a wearable device, etc., an image display device such as a DTV, a desktop computer, etc. and a service providing device such as a web server which provides web service, etc. For convenience of explanation, a mobile device or a PC may be exemplified.

Figure 1:
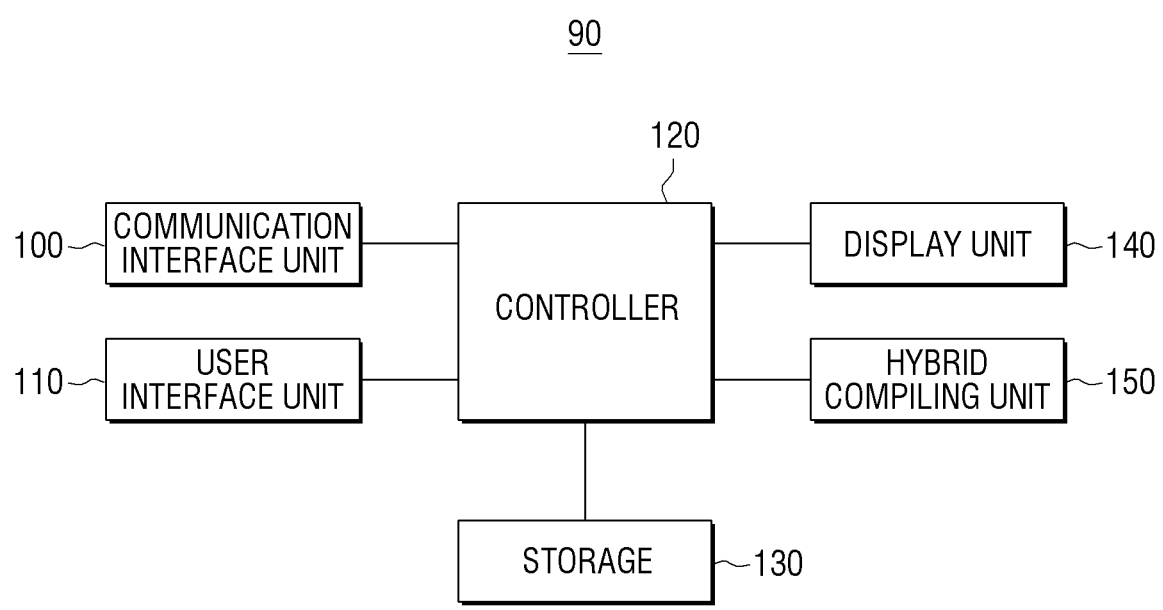
FIG. 1 is a block diagram illustrating an electronic device according to a first exemplary embodiment of the present invention.

As shown in FIG. 1, the electronic device 90 according to a first exemplary embodiment of the present invention may include a communication interface unit 100, a user interface unit 110, a controller 120, a storage 130, a display unit 140 and a hybrid compiling unit 150 all or in part.

The expression of including all or in part may indicate that some constituents such as the storage 130 or the display unit 140 may be omitted or the hybrid compiling unit 150 may be integrated into the controller 120, but for conveying full interpretation of the present invention, it will be assumed that the electronic device 90 may include all constituents above.

The communication interface unit 100 may access an external web server and receive image data when a user executes a web browser. The image data may include video/audio data and additional information in the case of broadcasting program provided from a broadcasting station. The communication interface unit 100 may receive wired or wireless image data for having wire/wires communication module. In addition, the communication interface unit 100 may receive image data by accessing an access point (AP) in neighbor with a short distance communication module.

The user interface unit 110 may receive a user command for operating the electronic device 90, for example, a mobile device. Such the user command may be received through a touch screen when the display unit 140 is embodied as a touch screen. In this regard, the display unit 140 may be within the range of the user interface unit 110. However, the user interface unit 110 according to an exemplary embodiment may refer to a physical button such as a power button for turning on or off the electronic device 90. When a keypad that is displayable on the touch screen, i.e. numeric and character buttons, etc. are configured as physical buttons, such the physical buttons may also be included.

In addition, the user interface unit 110 may include a capturing unit including a camera for image capturing, an audio output unit including a speaker for outputting sounds, etc. In this regard, the user interface unit 110 may include all elements relating to a user.

The controller 120 may control overall operations of the electronic device 90. For example, the controller 120 may separate image data received through the communication interface unit 100 into video/audio data and additional data with an image processing unit (not shown) and decode separated video and audio data. In addition, the controller 120 may control an operation for displaying the audio data on the display unit 140 and outputting sounds to an audio output unit after an operation such as scaling each decoded data.

Most of all, the controller 120 according to an embodiment of the present invention may execute the hybrid compiling unit 150 when a command for executing the hybrid compiling unit 150 is received. When a user selects a source code in the storage 130 for compiling, the controller 120 may execute the hybrid compiling unit 150 based on the user command and generate an execution file in the storage 130. In other words, the controller 120 may output a machine language, i.e. a binary code converted through the hybrid compiling unit 150 with respect to the input user command. The corresponding binary code may be recognized according to a user's additional command in the display unit 140 and the corresponding application may be executed. For example, when a user inputs a compiling command for a source code corresponding to a calculator in a specific programming language in the storage 130, the controller 120 may execute the hybrid compiling unit 150 and generate a calculator execution file with the binary code, recognize a user command when the user selects a calculator menu displayed on a screen of the display unit 140 and execute the operation accordingly.

It cannot be seen that such the operation is executed only when a command by a user interface (or a user command) is received. In other words, when it is assumed that a user reserves a specific application to be compiled or executed. When execution time approaches, that is, when a specific event occurs, the electronic device 90 or the controller 120 of the electronic device 90 may be automatically linked to the hybrid compiling unit 150. In this regard, a user command, an event, etc. according to an embodiment of the present invention may be a command for operating a specific program.

The storage 130 may include hard disk drive (HDD), read-only memory (ROM), and random-access memory (RAM). For example, in the case of Android phone, an operating system OS may be stored in a hard disk drive. In addition, pictures, videos, etc. that a user may wish to have for a long period of time may be stored in the ROM. The RAM may store the data the controller 120 temporarily processes. For example, the controller 120 may temporarily store the additional information separated from the received image data in the RAM of the storage 130, retrieve and use the information. When the information is reused, the space where the additional information is stored may be empty. That is, the RAM may be used to temporarily store data and quickly read the stored data.

The display unit 140 may display images. The display unit 140 may include a liquid crystal panel or an OLED panel to display images. In addition, a touch panel may be additionally attached on a liquid panel in order to embody a touch screen to which a user command is input. The display unit 140 according to an embodiment of the present invention may consist of a liquid panel and a touch panel, but may include a panel formed by adding a touch function to a single liquid panel.

The hybrid compiling unit 150 according to an exemplary embodiment of the present invention may have a form of program stored in a memory such as ROM, but may have a form where a part of the stored program, i.e. an SW module for performing a specific function is in a hardware form. For example, a registry may be replaced with a hardware memory in the SW module. In this regard, the hybrid compiling unit 150 may not be specified as a program. The hybrid compiling unit 150 may include a plurality of compilers. Each of the compilers, i.e. first and second compilers may be the SW modules, but one of the first and second compilers may be formed in the hardware form.

The hybrid compiling unit 150 may selectively execute the first and second compilers with respect to source codes of different programming languages. The source code may include a function for a plurality of commands relating to a user command and a variable depending on the function and consist of a set of the function and variable. In addition, the hybrid compiling unit 150 may selectively execute the first and second compilers with regard to the source codes of an identical programming language. The identical programming language may refer to the dynamic programming language such as JavaScript according to an exemplary embodiment of the present invention. Specifically, the hybrid compiling unit 150 may definitely execute the first compiler when a command for executing an operation of the program is a static programming language such as C language. In addition, when a dynamic programming language is received as a command and the dynamic programming language is compiled to a level of static programming language, the hybrid compiling unit 150 may execute the first compiler. On the contrary, when the dynamic programming language does not satisfy the designated conditions, the hybrid compiling unit 150 may execute the second compiler. It is assumed that the first compiler has higher capacity than the second compiler. In addition, the higher capacity may refer to swiftly processing data when an input command is converted into a mechanic language to be output. Accordingly, for example, when the first compiler is AOTC, the second compiler may be JITC.

For example, the dynamic programming language may be frequently used in embedded environment or mobile environment. In this regard, when the dynamic programming language such as JavaScript is processed by the AOTC, the capacity of the electronic device 90 may be maximized.

It will be described in more detail below, but in short, when in the hybrid compiling unit 150 according to an embodiment of the present invention, the dynamic programming language is processed by the AOTC, and it can be seen that compiling is performed by an AOTC compiler. In other words, in the case of dynamic programming language, the AOTC may be available or unavailable depending on a program source code. Therefore, according an exemplary embodiment of the present invention, in the case of a source code which is compiled by the AOTC, the capacity of processing the dynamic programming language may be increased.

In short, the hybrid compiling unit 150 according to an exemplary embodiment of the present invention may determine whether a variable type is changed with regard to an identical variable in the source code of the dynamic programming language corresponding to a command so as to determine whether the AOTC is available. For example, when a variable type 'int' which represents 'integer' and a variable type 'char' which represents 'character' are used together with regard to an identical variable T, the variable type may be changed. In this case, the AOTC may not be available. Therefore, when having an identical variable with respect to an identical function, the hybrid compiling unit 150 may inspect whether the AOTC is not available in terms of syntax. For example, the AOTC may not be available for a function 'eval' which represents 'evaluate' in its native sense. Thus, without a syntax, the AOTC may be available. According to an embodiment of the present invention, the former is a type inference process and the latter is a syntax checking process.

As a result of the above configuration, even in the dynamic programming language, when the AOTC is available, the AOTC may be selectively performed, so that the capacity of the electronic device 90 may be improved in the embedded environment (ex. PC) or mobile environment.

Specifically, when the source code provided by a user is compiled by the AOTC, a high-performance application by the AOTC may be provided. When the AOTC is not available, an application in a JITC mode may be created to ensure the compatibility of language.

In addition, when the JITC is selected, the JITC may be executed through an existing JIT compiler and have the same capacity as the existing JIT compiler accordingly.

Further, in the case of application where type inference is perfectly made and the AOTC is processed, even though the application includes the dynamic programming language, the optimized capacity closer to a static programming language such as C or C++ may be exhibited.

On the contrary, from the perspective of the manufacturer of the electronic device 90, by providing a syntax which prevents type inference or makes the AOTC unavailable to a program developer, the likelihood that a program created by a developer is compiled in the AOTC mode may be increased, thereby improving the capacity of the dynamic programming language of the electronic device 90.

Further, a user who uses the electronic device 90 may experience an application with improved processing capacity on average without having to know whether the application is in the AOTC mode or the JITC mode.

Figure 2:
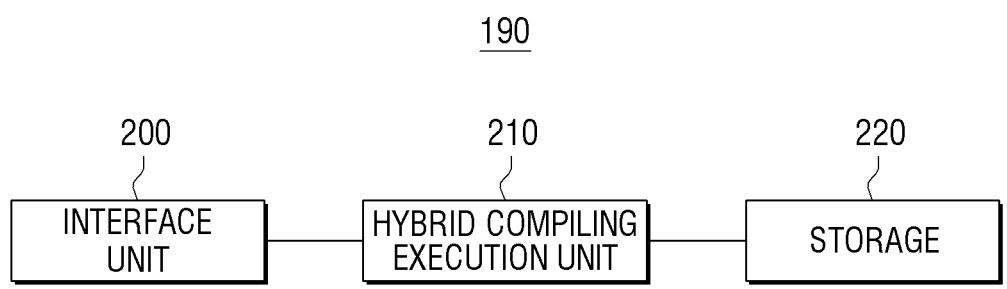
FIG. 2 is a block diagram illustrating an electronic device according to a second exemplary embodiment of the present invention.
Figure 3:
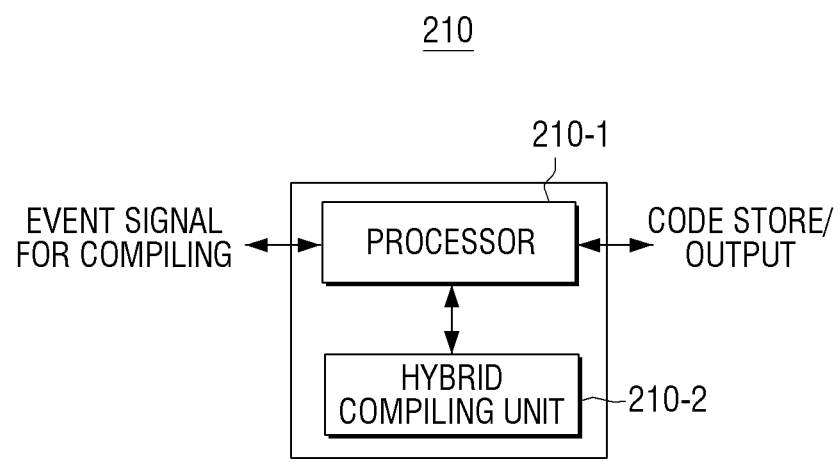
FIG. 3 is an exemplary view illustrating a hybrid compiling execution unit shown in FIG. 2.

FIG. 2 is a block diagram illustrating an electronic device according to a second exemplary embodiment of the present invention, and FIG. 3 is an exemplary view illustrating a hybrid compiling execution unit shown in FIG. 2.

As shown in FIGS. 2 and 3, the electronic device according to a second exemplary embodiment of the present invention may include an interface unit 200, a hybrid compiling execution unit 210 and a storage 220 all or in part.

The expression of including all or in part may have the same meaning as the preceding.

First, the electronic device 90 according to a second embodiment of the present invention may be a device such as a main computer or a web server which does not include the display unit 140 in FIG. 1 compared to the electronic device 90 shown in FIG. 1, or may be a device where the controller 120 and the hybrid compiling unit 150 shown in FIG. 1 are integrated into the form of at least one of HW/SW.

The interface unit 200 and the storage 220 may be the same as or similar to some or all of the communication interface unit 100 and the user interface unit 110 described with reference to FIG. 1 and the storage 130. Thus, the detailed description thereof will be omitted.

However, the hybrid compiling execution unit 210 may have the structure shown in FIG. 3. FIG. 3 illustrates a processor 210-1 and a hybrid compiling unit 210-2 in which a compiler is stored in a memory as an example. However, the processor 210-1 and the hybrid compiling unit 210-2 of FIG. 3 may be embodied as software in any cases, and thus the structure of the hybrid compiling execution unit 210 shown in FIG. 2 is not limited to FIG. 3 in an exemplary embodiment of the present invention.

It can be seen that the structure of the processor 210-1 and the hybrid compiling unit 210-2 shown in FIG. 3 is a modified form of the controller 120 and the hybrid compiling unit 150 shown in FIG. 1. However, the operation thereof may be different to some extent. In other words, the controller 120 may receive only the processing result by executing the hybrid compiling unit 150 in FIG. 1, but the hybrid compiling execution unit 210 of FIG. 2, when a power source of the electronic device 90 is applied, i.e. at the initial stage of system operation (ex. during a booting or after a booting), may retrieve a compiler stored in the storage 220 and store the compiler in an internal memory. Of course, it is also possible to modularize the compiler in the internal memory at the time of shipment of the electronic device 90, so that the above description is not particularly limited.

The hybrid compiling execution unit 210 of FIG. 2 may have the same structure as shown in FIG. 3, so that data processing may be performed more quickly than FIG. 2.

When it is assumed that a specific server is set up for updating specific data which is stored in the storage 220 of the electronic device 90 such as a main computer. In this case, in the hybrid compiling execution unit 210, when an event for updating occurs, the interface unit 200 may access an external device, for example, a server and update the data stored in the storage 220.

In this process, the hybrid compiling execution unit 210 may recognize a command of a specific programming language, and perform an operation based on the result thereof, and thus it may perform the operation same as or similar to that of the hybrid compiling unit 150 described with reference to FIG. 1. Therefore, the detailed description will be omitted.

Figure 4:
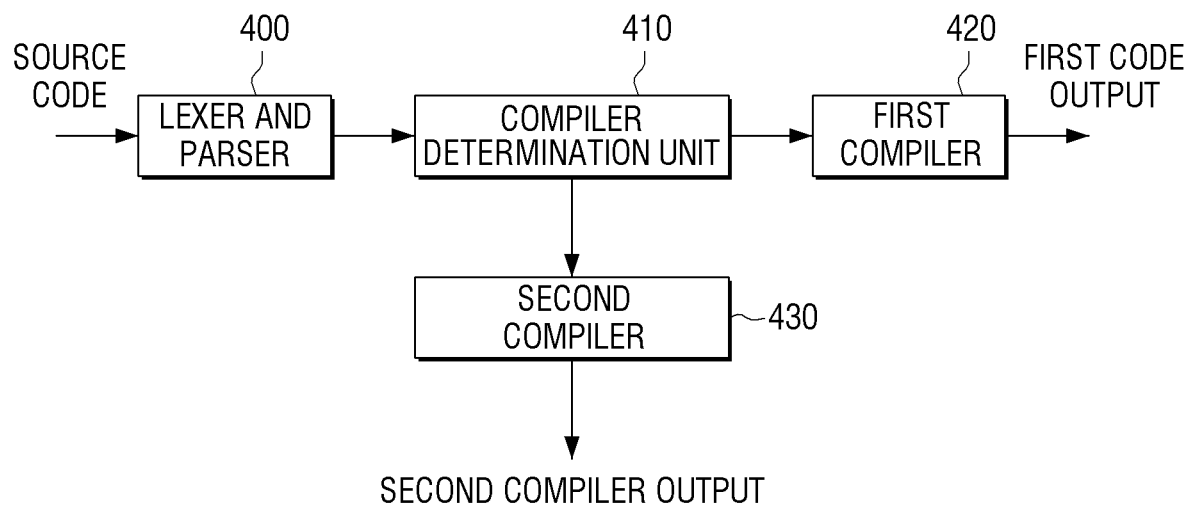
FIG. 4 is a first exemplary view illustrating a hybrid compiling unit shown in FIGS. 1 and 3.

FIG. 4 is a first exemplary view illustrating a hybrid compiling unit shown in FIGS. 1 and 3.

Referring to FIG. 4, hybrid compiling units 150 and 210-2 according to the first embodiment of the present invention may include a lexer and parser 400, a compiler determination unit 410, a first compiler 420 and a second compiler 430 all or in part.

The expression of including all or in part may indicate that some components such as the lexer and parser 400 may be omitted, or the compiler determination unit 410, the first compiler 420 and the second compiler 430 all or in part may be integrated. All the components will be included to convey full interpretation of the present invention.

For example, the forming of a partial code obtained by decomposing a source code relating to a command in the lexer and parser 400 into a tree form may be a program rule between program designers (or system designers) who wish to facilitate the operation of the first compiler 420 including a Low Level Virtual Machine (LLVM) of the AOTC. Therefore, when the AOTC is not available, the forming will be omitted.

Also, as fully described above, the compiler determination unit 410, the first compiler 420, and the second compiler 430 may denote a module unit for a specific software, i.e. a program. Therefore, since such the SW module can be configured with HW, it is not particularly limited as to whether the compiler determination unit 410, the first compiler 420 and the second compiler 430 refer to SW or HW.

Figure 5:
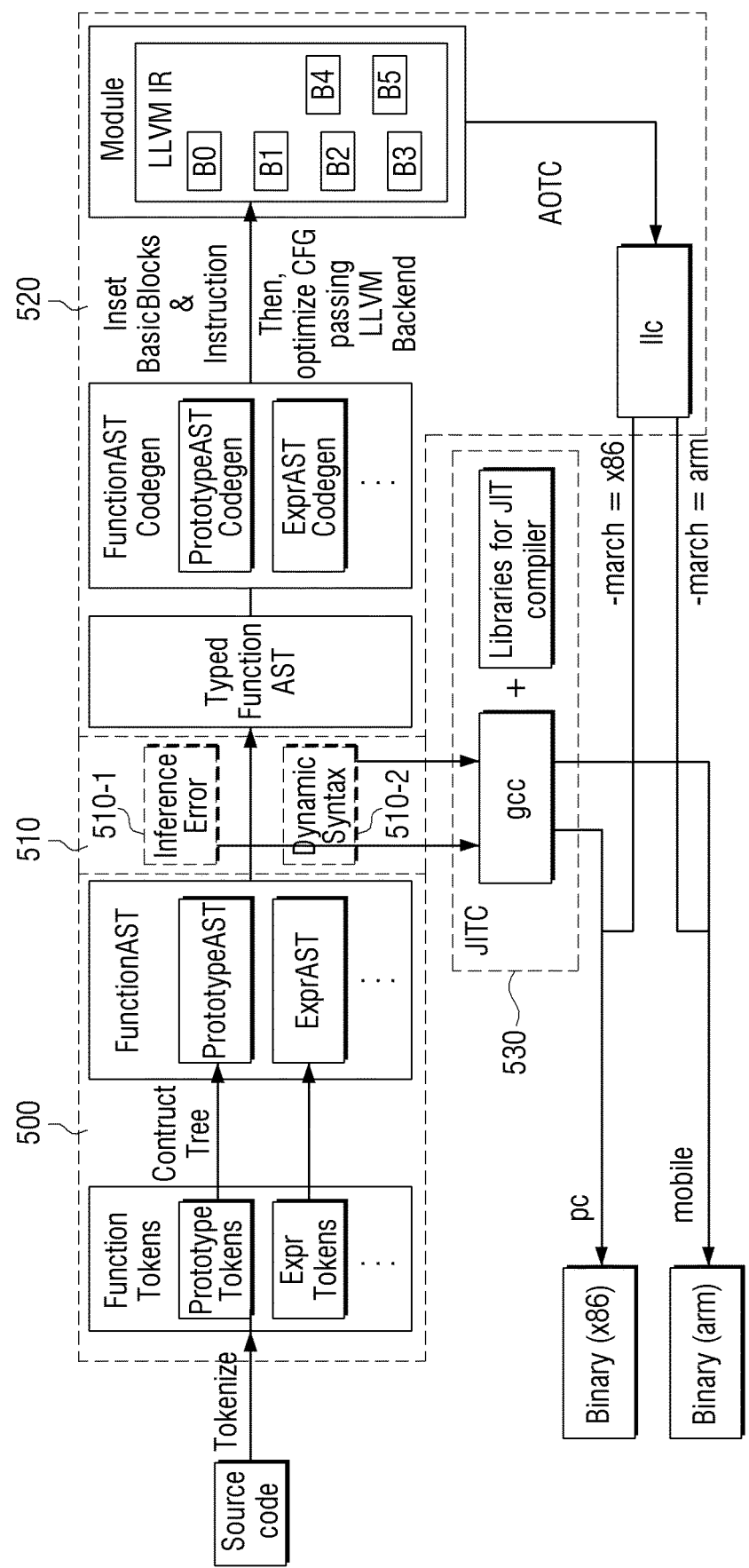
FIG. 5 is a second exemplary view illustrating the hybrid compiling unit shown in FIGS. 1 and 3.

However, for convenience of explanation, if FIG. 4 is for explaining the configuration of HW, it is assumed that FIG. 5 to be described below is for explaining the configuration of SW. Of course, in an embodiment of the present invention, the case of FIG. 5 is more preferable.

First, the lexer and parser 400 may be provided with a source code related to a command for operating a program. When the source code is stored in a separate memory, the stored source code may be retrieved to be used. The lexer and parser 400 may tokenize and decompose the received source code and generate a tree using the decomposed partial code. The partial code may refer to a part of the source code.

The compiling determination unit 410 may determine whether or not the received source code is a dynamic programming language. The first compiler 420 may compile a source code of a static programming language such as C language by determining whether the received source code is a dynamic programming language. The first compiler 420 may include an AOTC.

Also, when the input source code is a dynamic programming language, the compiling determination unit 410 may determine whether processing by the first compiler 420 such as the AOTC is available. If available, the first compiler 420 may be selected to execute the AOTC, but if not, the second compiler 430 may be selected to execute compiling. In other words, in an embodiment of the present invention, the input source code of the dynamic programming language may be selectively compiled by the first compiler 420 and the second compiler 430.

More specifically, in order to execute the AOTC on the source code of the dynamic programming language, a variable type may remain the same in an identical function with respect to an identical variable, and a syntax where the AOTC is not available in its nature sense may not be included. For example, when a variable type 'int' which indicates an integer and a variable type 'char' which indicates a character are present with respect to a function 'add' in the meaning of "add" in the source code, it does not meet the conditions of type inference process according to an embodiment of the present invention. Therefore, in this case, the second compiler 430 of the JITC may be selected. Even if an identical variable type is used for an identical variable, the second compiler 430 where the JITC is executed may be selected even if there is a function 'eval' which indicates the meaning 'evaluate' as a syntax where the AOTC is not available. Therefore, when both conditions are satisfied in the type inference process and the syntax checking process according to an embodiment of the present invention, the source code of the dynamic programming language may be compiled by the first compiler 420 where the AOTC is available.

As described above, the first compiler 420 may have higher compiling capacity than the second compiler 430 and execute the AOTC. Accordingly, the first compiler 420 may basically compile the input source code of the static programming language by the AOTC, and in the case of the source code of the dynamic programming language, only the source code selected by the compiling determination unit 410 may be compiled by the AOTC.

On the other hand, the second compiler 430 may execute the JITC that compiles the source code of the dynamic programming language. However, the second compiler 430 may compile only the selected and limited source code of the dynamic programming language determined by the compiling determination unit 410. The selected and limited dynamic programming language may indicate when the conditions of the type inference process and syntax checking process are not satisfied.

As a result of the above configuration, the compiling capacity of a device may be improved by processing the source code of the dynamic programming language optionally or selectively by the AOTC, compared to the case where all the source codes of the dynamic programming languages are processed by the JITC.

FIG. 5 is a second exemplary view illustrating the hybrid compiling unit shown in FIGS. 1 and 3.

For convenience of explanation, in order to distinguish from FIG. 4, it is presumed that FIG. 5 is an SW module, the first compiler 420 of FIG. 4 is an AOTC, and the second compiler 430 is a JITC.

As shown in FIG. 5, hybrid compiling units 150' and 210-2' according to a second embodiment of the present invention may include a lexer and parser module 500, a compiling determination module 510, a first compiling module 520 and a second compiling module 530 all or in part.

The expression of including all or in part may have the meaning same as or similar with the description relating to FIG. 4.

The lexer and parser module 500 may tokenize and decompose a given source code and generate an Abstract Syntax Tree (AST) consisting of decomposed (partial) codes.

The compiling determination module 510 may also be divided into a type inference module 510-1 and a syntax checker 510-2. This allows a user to select an appropriate compiling mode. In other words, the type inference module 510-1 may proceed with type inference for variables in the AST, and the syntax checker 510-2 may check whether a syntax is appropriate for the AOTC.

As a result of checking, when it is determined that the syntax is suitable for the AOTC, a typed function AST may be generated and provided to the first compiling module 520 which executes an AOTC. Otherwise, the compiling determination module 510 may be provided to the second compiling module 530 which executes a JITC.

The first compiling module 520 may perform compiling by using an AOTC method according to an embodiment of the present invention, and the second compiling module 530 may perform compiling by using a JITC method.

More specifically, the hybrid compiling units 150' and 210-2' according to an embodiment of the present invention may perform a hybrid method for applying the AOTC to a part of the dynamic programming language where the AOTC is available although is it difficult to apply the AOTC TO the dynamic programming language, and applying the JITC to other parts. Not having a particular type may be the biggest barrier which makes it difficult to apply the AOTC to the general dynamic programming language. Therefore, in an embodiment of the present invention, the type inference module 510-1 in a compiler as above may add types to a variable used through inference. In the type inference module 510-1, the type inference with respect to each variable may be proceeded while performing analysis through a tree traversal on the AST obtained from the lexer and parser module 500 and the variable may be converted into a type annotated variable. Considering the characteristic of the dynamic programming language, the type inference module 510-1 may not always completely perform the type inference of all variables. There are also cases where a type is not fixed. In this case, an inference error may occur, and the dynamic programming language may be moved to the second compiling module 530 to perform compiling in the JIT mode.

When there is no error in the type inference module 510-1, the syntax checker 510-2 may operate. The dynamic programming language may often include not only dynamic typing but also dynamic features which prevent various static compiling. For example, a characteristic of the function 'eval' of JavaScript may have a separate code as 'argument' in a string form, and compile (and execute) the code when the 'eval' function is retrieved. In the case of a program containing such dynamic characteristics, static compiling may be difficult to perform, so that the compiling may not be available to proceed in the AOTC mode. Therefore, the syntax checker 510-2 may check whether the AOTC mode is available, and although the AOTC mode is available, check whether a syntax includes a capacity which is hard to expect to perform more than the JITC, generate a syntax error, move to the second compiling module 530 and perform compiling in the JIPC mode.

In FIG. 5, when successfully passing though the type inference module 510-1 and the syntax checker 510-2, the type annotated AST may be completed and the variable may move to the first compiling module 520, and the AOTC may be executed. A code generator may complete Intermediate Representation (IR) (e.g., LLVM IR) with traversing each AST node. In other words, the code generator may complete an intermediate form before conversion to a target language. The IR may be optimized through an optimizer of a backend, and a machine code may be generated for each target platform and provided to a program user.

When the JITC mode is selected, a hybrid compiler according to an embodiment of the present invention may create a C++ application that wraps a program source code and embed an existing JIT compiler. For example, in the case of JavaScript, a JIT compiler such as JavaScript engine (V8) or JSC may be used. When a program user executes the C++ application, the source code of the dynamic programming language including therein may be executed by the JITC.

Figure 6A:
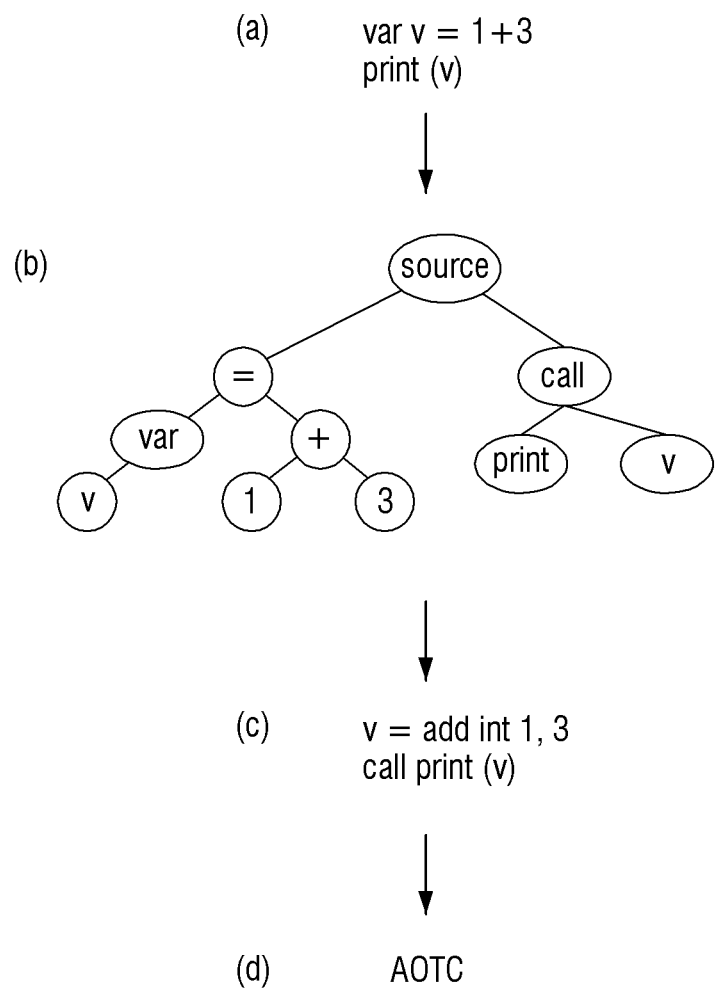
FIGS. 6A to 6C are added views provided to understand a processing of each module in FIG. 5.
Figure 6B:
Figure 6B:
Figure 6B:
Figure 6C:
Figure 6C:

FIGS. 6A to 6C are added views provided to understand a processing of each module in FIG. 5. FIGS. 6A to 6C show the result of processing each different source code. Each (a) of FIGS. 6A to 6C is in the form of a source code. For example, when a user provides a command "store two integers in a variable and output the integers", the same source code as in (a) of FIG. 6A may be generated.

The lexer and parser module 500 of FIG. 5 may generate the same tree as in (b) of FIG. 6A with respect to the same source code in (a) of FIG. 6A.

The compiler determination module 510 of FIG. 5 may determine whether a variable 'int' which indicates an integer with respect to a variable 'v' is maintained (600) as shown in (c) of FIG. 6A while performing analysis through a tree traversal. In case of the source code in (a) of FIG. 6B, it is determined that the variable type may be changed (610) for the same variable as shown in (c) of FIG. 6B and the compiling may be performed by the JITC as shown in (d) of FIG. 6B.

The compiler determination module 510 may check whether the same variable type is maintained as shown in (c) of FIG. 6B and process the syntax check. As a result of checking a syntax, when a syntax 620 such as a function 'eval' is present as in (a) of FIG. 6C, the dynamic programming language may be processed by the JITC as shown in (d) of FIG. 6C. However, when the syntax 620 such as the function 'eval' where the AOTC is not available due to its language characteristic is not present, the dynamic programming language may be processed by the AOTC. In other words, in the case of FIG. 6A, the dynamic programming language may be through the compiler determination module 510 and processed by the AOTC.

Figure 7:
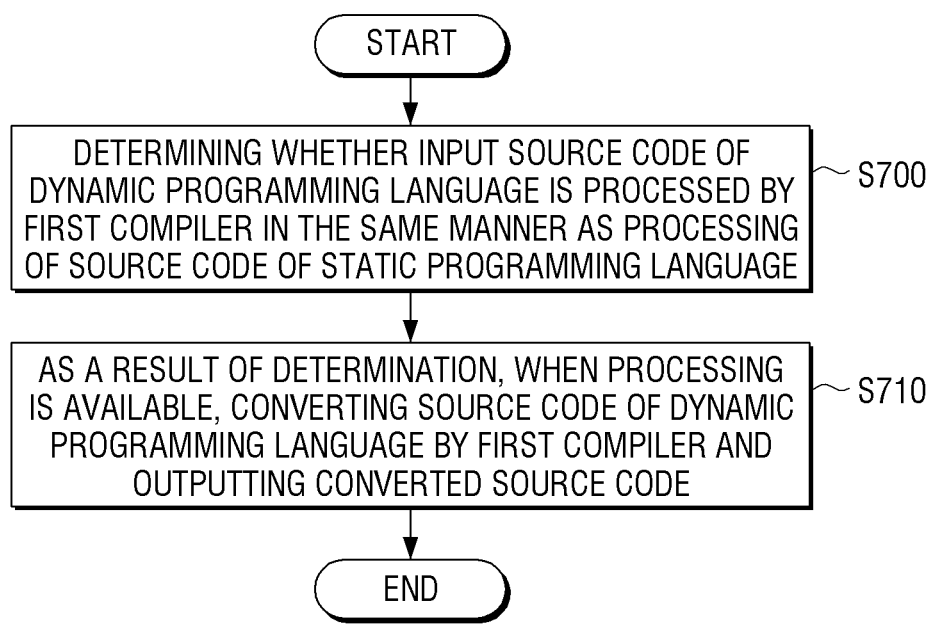
FIG. 7 is a flow chart showing a compiling process according to a first exemplary embodiment of the present invention.

FIG. 7 is a flow chart showing a compiling process according to a first exemplary embodiment of the present invention Referring to FIG. 7 with reference to FIG. 1 for convenience of explanation, the electronic device 90 according to an embodiment of the present invention may determine whether an input source code of a dynamic programming language is processed by a first compiler in the same manner a processing of a source code of a static programming language (S700). The first compiler may include a compiler where an AOTC is available. Accordingly, the electronic device 90 may proceed with the type inference process and the syntax checking process as described above to determine the possibility.

Also, when the electronic device 90 determines that the source code may be processed, the source code of the dynamic programming language may be converted by the first compiler and the converted source code may be output. The converted source code may be a machine language such as a binary code.

In addition, the electronic device 90 may convert the source code of the dynamic programming language by a second compiler and output the converted source code. For example, when the second compiler performs the JITC, it can be considered that the input source code of the dynamic programming language may not be processed by the first compiler.

The electronic device 90 may perform an operation for a command to operate a program by recognizing an output machine language i.e. a binary code. For example, the electronic device 90 may perform an operation by recognizing the machine language, which is the binary code, with respect to the command 'store an image in a memory'.

Figure 8:
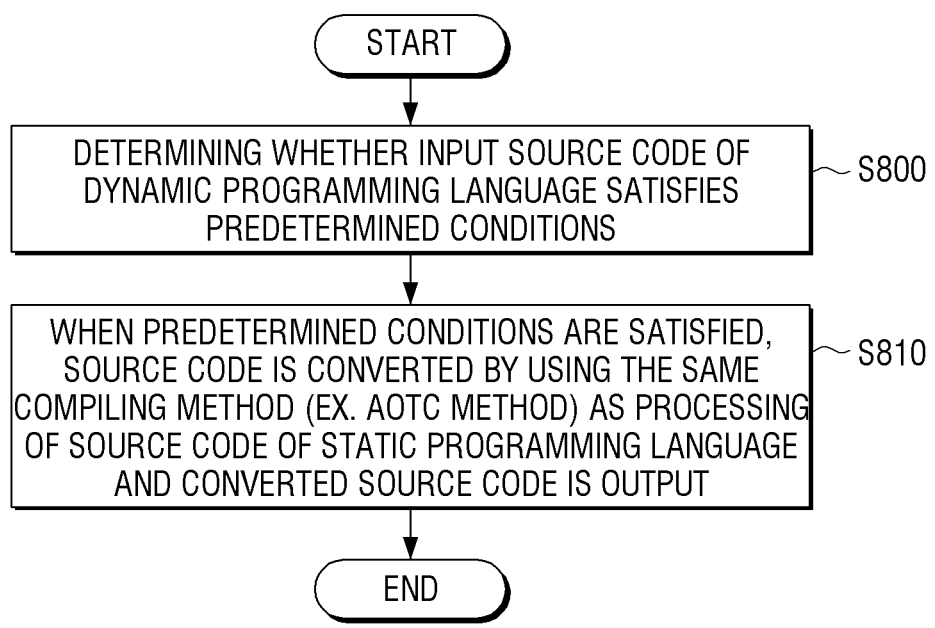
FIG. 8 is a flow chart showing a compiling process according a second exemplary embodiment of the present invention.

FIG. 8 is a flow chart showing a compiling process according a second exemplary embodiment of the present invention.

FIG. 8 shows an operation modified from FIG. 7, and it is presumed that a second compiler may not be included as in FIG. 7.

Referring to FIG. 7 with reference to FIG. 1 for convenience of explanation, the electronic device 90 according to another exemplary embodiment of the present invention may determine whether an input source code of a dynamic programming language satisfies predetermined conditions (S800). The predetermined conditions may relate to whether an identical variable (ex. an integer int) is used for an identical function (ex. add) or whether a specific syntax (ex. eval) is included.

Upon the result of determination, when the predetermined conditions are satisfied, the electronic device 90 may convert a source code by the same compiling method (ex. an AOTC method) as a processing of a source code of a static programming language and output the converted source code (S810).

Figure 9:
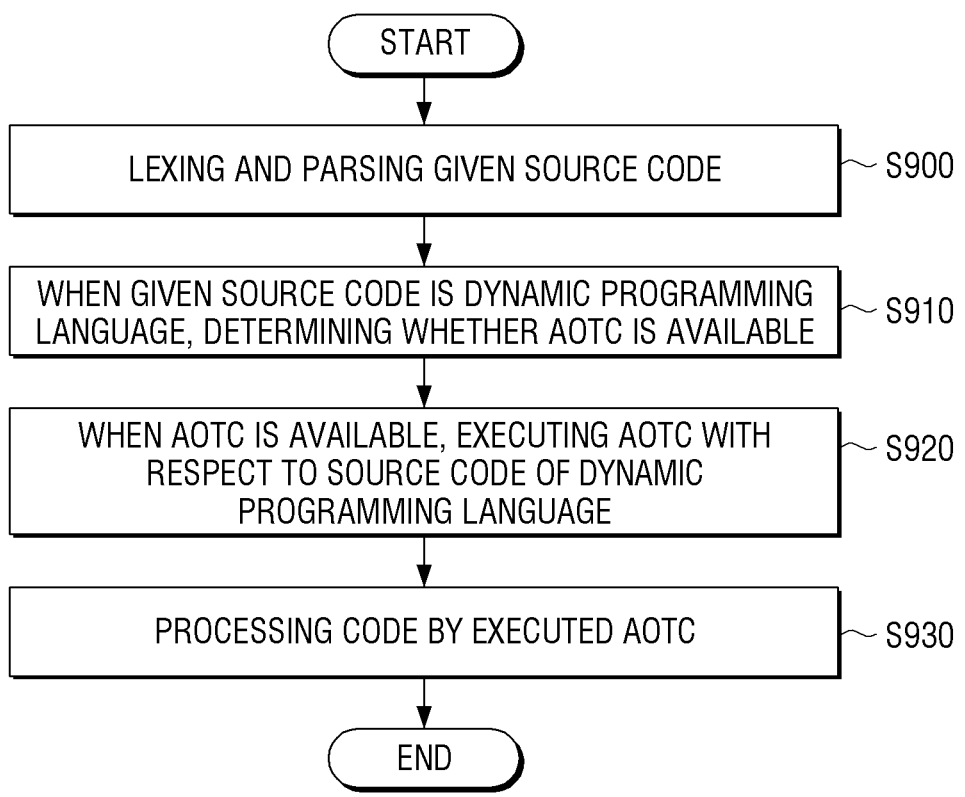
FIG. 9 is a flow chart showing a compiling process according to a third exemplary embodiment of the present invention.

FIG. 9 is a flow chart showing a compiling process according to a third exemplary embodiment of the present invention.

FIG. 9 presumes a case in which a parsing is performed as the Low Level Virtual Machine (LLVM) is included in order to perform an AOTC method.

For convenience of explanation, referring to FIG. 9 with FIG. 1, the electronic device 90 according to an embodiment of the present invention may perform lexing and parsing of a given source code (S900).

The electronic device 90 may determine whether an AOTC is available when the given source code is a dynamic programming language (S910). To this end, the electronic device 90 may first determine whether the source code is the dynamic programming language. Whether the AOTC is available is explained exemplifying the type inference process and the syntax checking process beforehand, and thus further description will be omitted.

The electronic device 90 may perform the AOTC with respect to the source code of the dynamic programming language when the AOTC is determined to be available (S920).

The electronic device 90 may process a code generated by the executed AOTC, i.e. a binary code as a machine language (S920). Processing may indicate that a compiler outputs codes.

As a result, the electronic device 90 may perform an operation based on a command, more precisely, based on an output binary code.

Figure 10:
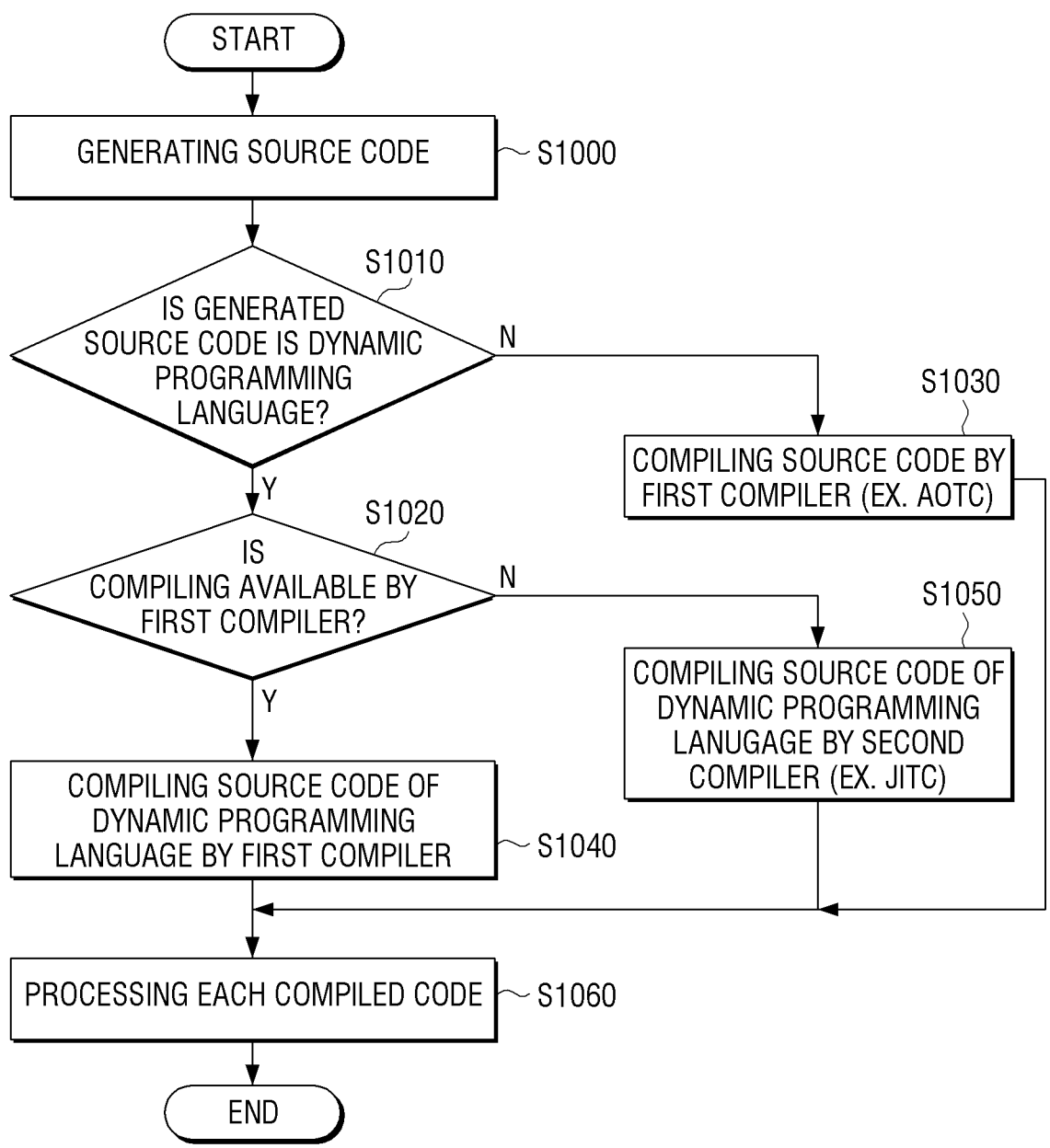
FIG. 10 is a flow chart showing a compiling process according to a fourth exemplary embodiment of the present invention.

FIG. 10 is a flow chart showing a compiling process according to a fourth exemplary embodiment of the present invention.

FIG. 10 includes a process of determining the type of language in FIG. 9 and it is presumed that a first compiler and a second compiler are included.

Referring to FIG. 10 with reference to FIG. 1 for convenience of explanation, the electronic device 90 according to an exemplary embodiment of the present invention may generate a source code (S1000). Generation of the source code may be made when a user command is received or an event in predetermined conditions occurs. For example, the predetermined conditions may relate to whether a mobile device receives a request for updating specific data from an external web server.

The electronic device 90 may determine whether the generated source code is a source code of a dynamic programming language (S1010).

When it is determined that the generated source code is the source code of the dynamic programming language, the electronic device 90 may additionally determine whether the source code is compiled by a first compiler where an AOTC is executed (S1020). It is assumed that the first compiler has more excellent capacity than the second compiler. In addition, since the description regarding the possibility has been fully made above, further explanation will be omitted.

On the contrary, when it is determined that the generated source code is a static programming language such as C language, not the dynamic programming language at step S1010, the source code may be compiled by the first compiler (S1030).

In addition, at step S1020, when it is determined that the source code is compiled by the first compiler, the electronic device 90 may compile the source code of the dynamic programming language by the first compiler (S1040).

However, at step S1020, when it is determined that the source code is not compiled by the first compiler, the source code of the dynamic programming language may be compiled by a second compiler such as JITC (S1050).

The electronic device 90 may process codes which are compiled and generated at each of step S1030, step S1040 and step S1050 (S1060). The processing may refer to outputting a generated binary code as described above.

It has been described that all the components constituting the exemplary embodiment are combined in one or are combined to operate, but this is not limited thereto. For example, at least one or more of all the components may be selectively combined to operate within the object scope. Each of the components may be implemented with one piece of independent hardware, but a part or all of the components may be selectively combined to be implemented with computer program having a program module which performs a part or all of functions combined in one or a plurality of pieces of hardware. Codes and code segments constituting the computer program may be easily construed by those skilled in the art. The exemplary embodiment may be implemented by storing the computer program or method in a non-transitory computer-readable medium and reading and executing the computer program through a computer.

The non-transitory computer readable medium may refer, for example, to a medium that semi-permanently stores data therein and is readable by a device. In detail, the programs described above may be stored and provided in the non-transitory computer readable medium such as a CD, a digital versatile disk (DVD), a hard disk, a Blu-ray disk, a USB, a memory card, a ROM, or the like.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for compiling a source code of a dynamic programming language compiled during program execution to a level of a static programming language compiled before program execution, the method comprising:
    tokenizing and decomposing a source code of the dynamic programming language and forming a decomposed partial code into a tree form;
    identifying, based on the decomposed partial code containing a function (func) relating to a command and a variable depending on the function, whether a type of the variable is changed with regard to an identical variable in the source code corresponding to the command;
    identifying, based on the type of the variable being maintained, whether the decomposed partial code includes a syntax in conformity with a first compiler by identifying whether the function is compilable by the first compiler;
    identifying that converting is available based on the syntax of the decomposed partial code being in conformity with the first compiler;
    converting the decomposed partial code by the first compiler and outputting the converted partial code based on the converting being available as a result of the identifying; and
    converting the decomposed partial code by a second compiler and outputting the converted partial code based on the converting being not available as a result of the identifying.

2. The method as claimed in claim 1,
wherein the first compiler comprises a compiler in which Ahead-of Time Compilation (AOTC) is available, and
wherein the second compiler comprises a compiler in which Just-in-Time Compilation (JITC) is available.

3. The method as claimed in claim 1,
wherein the identifying whether the decomposed partial code is converted by the first compiler comprises analyzing the decomposed partial code formed in the tree form and identifying whether conversion by the first compiler is available.

4. An electronic device for compiling a source code of a dynamic programming language compiled during program execution to a level of a static programming language compiled before program execution, comprising:
a processor configured to:
tokenize and decompose a source code of the dynamic programming language,
form a decomposed partial code into a tree form,
identify, based on the decomposed partial code containing a function (func) relating to a command and a variable depending on the function, whether a type of the variable is changed with regard to an identical variable in the source code corresponding to the command,
identify, based on the type of the variable being maintained, whether the decomposed partial code includes a syntax in conformity with a first compiler by identifying whether the function is compilable by the first compiler,
identify that converting is available based on the syntax of the decomposed partial code being in conformity with the first compiler,
convert the decomposed partial code by the first compiler based on the converting being available as a result of identification, and
convert the decomposed partial code of the dynamic programming language by a second compiler and outputting the converted partial code based on the converting being not available as a result of the identifying.

5. The electronic device as claimed in claim 4,
wherein the first compiler comprises a compiler in which Ahead-of Time Compilation (AOTC) is available, and
wherein the second compiler comprises a compiler in which Just-in-Time Compilation (JITC) is available.

6. The electronic device as claimed in claim 4, wherein the processor is further configured to:
analyze the decomposed partial code formed in the tree form, and
identify whether conversion by the first compiler is available.

7. The electronic device as claimed in claim 4, wherein the processor, when a syntax of a predetermined language does not exist in the decomposed partial code, is further configured to identify that a syntax of the decomposed partial code is in conformity with the first compiler.

8. The electronic device as claimed in claim 7, wherein the syntax of the predetermined language comprises a specific function designated by a user or a system designer.

9. The electronic device as claimed in claim 8, wherein the designated specific function comprises a function 'eval (uate)'.

* * * * *